The United States Patent Office 3,041,933
Patented July 3, 1962

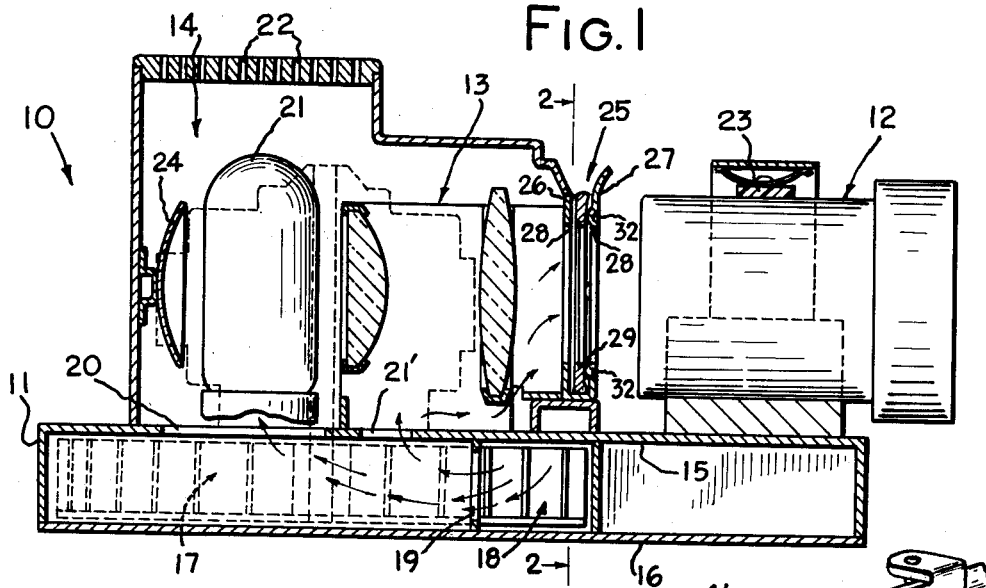
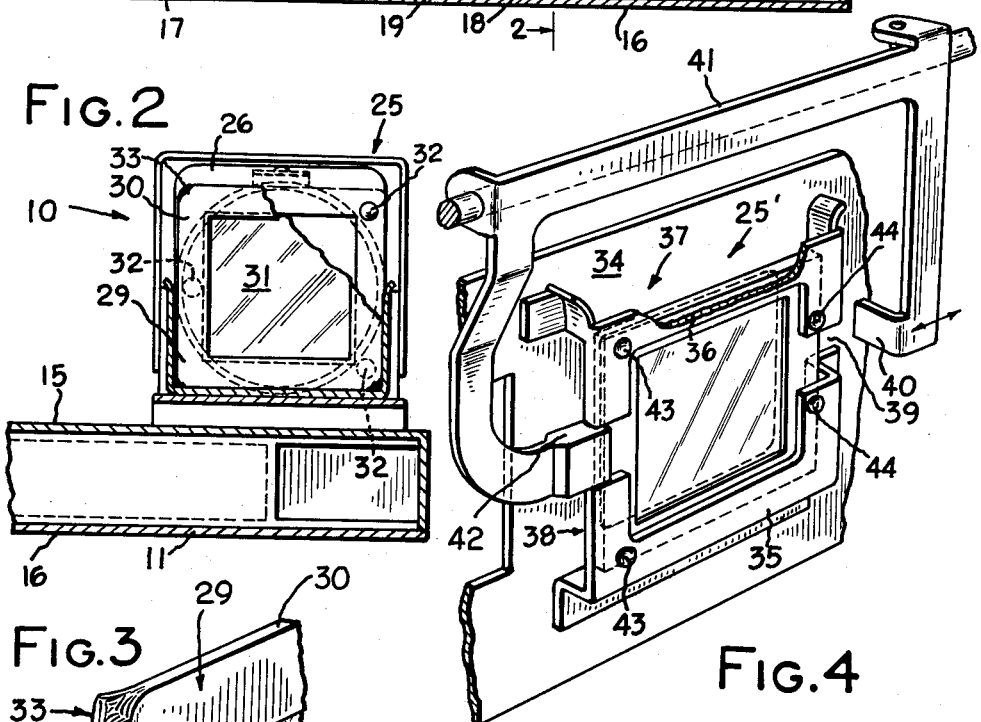
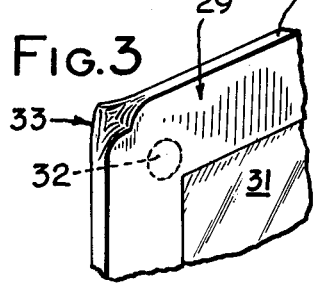

3,041,933
SLIDE PROJECTOR
Henry J. Emmel, Irondequoit, N.Y., assignor to Bausch &
Lomb Incorporated, a corporation of New York
Filed Nov. 18, 1959, Ser. No. 853,729
4 Claims. (Cl. 88—26)

This invention relates generally to transparent slide projectors and is more particularly concerned with the mechanism of such projectors for retaining the transparent slides in the focal plane of the projection lens assembly during projection of the slide onto a viewing screen.

In most slide projectors a slide receptacle is provided in the form of a pair of substantially parallel members. A slide is inserted into this receptacle which is designed so as to retain the slide in optical alignment with the projector illumination lamp and projection lens assembly. In order to facilitate insertion of the slides into and removal of the slides from the receptacle, it is customary to form the receptacle slightly wider than the thickness of the slides with means being provided to retain the slides against one side of the receptacle during projection of the image of the slide onto a viewing screen. Conventionally, mechanical devices are used for retaining the slides against the one side of the receptacle and in the case of at least one commercial slide projector a portion of the air supplied by the projector cooling fan is directed against the slide in order to force the same against the opposite side of the slide receptacle to thereby retain the slide in the substantial focal plane of the projection lens assembly.

It has been found that in a slide projector of the aforementioned type wherein a portion of the air supplied by the projector cooling fan is utilized for retaining the slide in the proper position in the slide receptacle, if the slide is bent or the corners are damaged the slide will not be retained in the proper focal position and the resultant image will be blurred. The principal object of the present invention is, therefore, to provide means for improving the positioning of a transparent slide within a slide receptacle so as to increase the chance for accurate focusing of the image on the viewing screen.

A more detailed object of the present invention is to provide boss means or projections which project inwardly from the front side of the slide receptacle and which together define a common plane such that when a transparent slide disposed within the receptacle is moved into engagement with all of the projections, the slide will be disposed in the substantial focal plane of the projection lens assembly.

It has been found that providing what, in effect, amounts to three-point positioning of the slides at points slightly removed from the corners or periphery of the slides the chances that the slides will be aligned in the focal plane of the projection lens assembly are greatly enhanced.

Among the advantages afforded by the present invention is the fact that substantially new or undamaged slides are held in the proper position and old slides which are bent or the corners of which are somewhat damaged are more likely to be positioned so as to provide a sharp image on the viewing screen.

The foregoing objects and advantages, as well as others, will become more apparent from the following description of the present invention wherein:

FIG. 1 is a side elevational view, shown in cross-section, and illustrating the principal features of a first embodiment of the present invention;

FIG. 2 is a sectional view taken substantially along the line 2—2 in FIG. 1 and looking in the direction of the arrows;

FIG. 3 is a fragmentary view of a transparency or slide adapted to be used in projectors of the type disclosed in FIGS. 1 and 2; and FIG. 4 is a perspective fragmentary view illustrating a second embodiment of the present invention.

With reference now to the drawings wherein like reference numerals in the different views have been used to identify identical parts, a slide projector designated generally by reference numeral 10 comprises a base 11, a projection lens assembly 12, a condenser lens assembly 13 and a light source 14.

The base 11 consists of top and bottom panels 15 and 16 and a fan 17 is suitably mounted within the base 11 between panels 15 and 16 for providing a supply of air through passage 18, primarily for cooling the light source 14. Suitable openings 19, 20 and 21' are provided for transmitting the air from source 18 into the main portion of the slide projector. Air passing through opening 20 is directed toward the light source 14 comprising a bulb 21 and, after tending to cool the bulb 21 somewhat, passes out through a plurality of openings 22 formed in the top of the projector housing.

The projection lens assembly 12 may be resiliently held in fixed position in optical alignment with the light source 14 by means of a spring-urged detent member 23. Thus, the projection lens assembly 12 may be moved axially in order to properly focus the projector. The light source 14 also includes a reflector 24 for increasing the intensity of the light from the light source 14. The light source 14, condenser lens assembly 13 and projection lens assembly 12 are disposed in optical alignment with one another.

The projector housing includes a slide receptacle 25 which is formed by one face 26 comprising an integral part of the projector housing and a second substantially parallel face 27 disposed in slightly spaced relation with respect to face 26. The slide receptacle 25 is formed with a suitable opening 28 in the rear face 26 and front face 27 in order that when a transparent slide 29 is disposed within the receptacle 25, it will be in optical alignment with the light source 14, condenser lens assembly 13 and projection lens assembly 12.

The slides 29 comprise a peripheral portion or border 30 and a central portion 31 comprising the object. In order to provide a sharp image of the slide 31 on a viewing screen (not shown), the slide 25 should be disposed in the substantial focal plane of the projection lens assembly 12. In order to so position the slide 25, a plurality of bosses or projections 32 are formed on the receptacle side 27 and face inwardly with respect to the receptacle 25 or toward the rear of the projector assembly. The dotted representation of a projection 32 in FIG. 3 is merely intended to show where one of the projections 32 strikes or engages the slide 29 when the slide is disposed in projection position in the receptacle 25. The projections 32, as shown in FIGS. 1 and 2, comprise three projections which together form a common plane such that when the slide 29 is disposed with its border portion 30 in engagement with the three points defined by projections 32, the slide will lie in the substantial focal plane of the projection lens assembly 12. A portion of the air supplied by the fan 17 and the portion of air which passes through opening 21 is directed against the slide 29 and retains the latter in engagement with projections 32 so as to improve the sharpness of the projected image. It will be seen, particularly from FIGS. 2 and 3, that the projections 32 contact the border portion 30 of the slide 29 adjacent the periphery of the transparent portion 31 but removed as far as conveniently possible from the corner 33 of the slide 29. This improves the chances that the slide will be retained in the focal plane of the projection lens assembly 12 when it engages the projections 32 even though the corners 33 of the slide may be damaged or the slide may be bent or otherwise damaged.

With reference now to FIG. 4, a second form of the invention is shown which is applicable to a slide projector of the automatic slide changing variety. In FIG. 4, a slide receptacle 25' comprises the front side 34 of the projector and a pair of plate members 35 and 36 which may be securely fastened to the member 34 by means of welding or other desired means. The two members 35 and 36 together form the front side of the receptacle 25'. The receptacle 25' is open at the top, as indicated at 37, and at one end as indicated at 38, to facilitate insertion of a slide 29 into the receptacle 25' and withdrawal of the slide 29 from the receptacle 25' from the slot 38 and, if it is desired to remove a slide 29 for purposes of inspection, the same may be removed through the slot 37 at the top of the receptacle 25'. It will be noted that a central slot 39 is formed between the two members 35 and 36 and a foot 40 of slide changing mechanism 41 is adapted to slide through this slot 39. The foot 40 is adapted to engage the right edge of slide 29 to remove the latter from receptacle 25', whereas a foot 42 is adapted to engage the left side of a slide 29 in order to move the same into the receptacle 25' through slot 38.

A plurality of projections or bosses 43 and 44 are respectively disposed at the extremities of one vertical edge of the side of the receptacle formed by members 35 and 36 and adjacent the slot 39 along the opposite vertical edge of the receptacle 25'. The projections 43 and 44 are directed inwardly in order to provide projections corresponding to the projections 32 against which a slide 29 may be retained by means of a portion of the air provided by the projector lamp cooling air supply. The projections 44 are disposed close together so as to simulate, as nearly as possible, a single point, however, all of the projections 43 and 44 are disposed in a common plane which is so disposed as to position the slide 29 in the focal plane of the projector lens assembly of the projector.

It will be noted that both the projections 32 in the first embodiment of the invention and the projections 43 and 44 are disposed to the left or to the right of the transparent portion of the slide and this makes it possible to remove the slide 29 from the slide receptacle from the slot at the top of the receptacle without having the transparent portion of the slide engage any of the projections and thereby minimizing the possibility of damage to the slides during the removal thereof through the top slot of the receptacle. It will further be noted that the projections 43 are respectively disposed above and below the transparent portion 31 of the slide so that when the slide is moved into the receptacle 25' by means of the pusher foot 42 the projections 43 do not rub the transparent portion 31 of the slide. The fact that the projections 44 are disposed near the middle of the slide is of no consequence from the standpoint of damaging the transparent portion of the slide, as the transparent portion of the slide never engages the projections 44 as the slide 29 is stopped by the opposite end of the receptacle 25'. Further, by providing the three-point positioning of the slide, the alignment thereof is greatly improved over the alignment possible with only a flat surface against which the slide 29 may abut, for in the latter case any bends or projections on the slide will prevent it from being disposed in entirety in the focal plane of the projection lens assembly 12. With the present construction the effect of the damage projections on the slide 29 is minimized.

It is contemplated that numerous changes and modifications may be made in the present invention without departing from the spirit or scope thereof.

What is claimed is:

1. In a slide projector including an optically aligned light source and projection lens assembly and also including a source of air for cooling said light source, the combination of means defining a slide receptacle for receiving a slide having a peripheral border portion and aligning the slide so that a central transparent portion thereof is in optical alignment with respect to said light source and projection lens assembly, said receptacle having slots along the top and one end edge for facilitating removal of a slide from or insertion of a slide into the receptacle through either of said slots, said slide receptacle including a plurality of projections directed inwardly from one side of said receptacle and disposed for respectively engaging the peripheral border portion of a slide disposed in said receptacle for enabling insertion into or removal of the slide from said receptacle without engagement of said projections with said central transparent portion, said projections together defining a plane such that a slide disposed with its peripheral portion in engagement with said projections is in the substantial focal plane of said projection lens assembly, and means for directing a portion of air from said source toward said transparent slide disposed in said receptacle to retain the slide against said projections and thereby in focus.

2. In a slide projector including an optically aligned light source and projection lens assembly and also including a source of air for cooling said light source, the combination of means defining a slide receptacle for receiving a slide having a peripheral border portion and aligning the slide so that a central transparent portion thereof is in optical alignment with respect to said light source and projection lens assembly, said receptacle having slots along the top and one end edge for facilitating removal of a slide from or insertion of a slide into the receptacle through either of said slots, said slide receptacle including a plurality of projections directed inwardly from one side of said receptacle and being disposed adjacent the extremities of one edge of said one side of said receptacle and adjacent the middle of the opposite edge of said one side of said receptacle for engaging the peripheral border portion of a slide disposed in said receptacle for enabling insertion into or removal of the slide from said receptacle without engagement of said projections with said central transparent portion, said projections together defining a plane such that a slide disposed with its peripheral portion in engagement with said projections is in the substantial focal plane of said projection lens assembly, and means for directing a portion of air from said source toward said transparent slide disposed in said receptacle to retain the slide against said projections and thereby in focus.

3. In a slide projector including an optically aligned light source and projection lens assembly and also including a source of air for cooling said light source, the combination of means defining a slide receptacle for receiving a slide and aligning the same in optical alignment with respect to said light source and projection lens assembly, said receptacle having a slot along one vertical edge for facilitating removal of a slide from or insertion of a slide into the receptacle through said slot, said slide receptacle including a plurality of projections directed inwardly from one side of said receptacle and disposed adjacent the substantial extremities of said edge in which said slot is formed and adjacent the substantial middle of the opposite edge for facilitating insertion into or removal of a slide from said receptacle without engagement of the central portion of the slide with said projections, said projections together defining a plane such that a slide disposed with its peripheral portion in engagement with said projections is in the substantial focal plane of said projection lens assembly, and means for directing a portion of air from said source toward said transparent slide disposed in said receptacle to retain the slide against said projections and thereby in focus.

4. In a slide projector including an optically aligned light source and projection lens assembly and also including a source of air for cooling said light source, and a reciprocable mechanism for alternately moving a slide into and out of projection position, the combination of means defining a slide receptacle for receiving a slide when the latter is moved into projection position by said reciprocable mechanism and aligning the same in optical alignment with respect to said light source and projection lens assembly, said receptacle comprising opposed sides one of which is cut away at the middle to permit free movement of said reciprocable mechanism and including a plurality of projections directed inwardly from one side of the receptacle, said projections being disposed adjacent the extremities of one vertical edge of said receptacle and adjacent the cut away portion of the opposite vertical edge of said receptacle and together defining a plane such that a slide disposed in engagement with said projections is in the substantial focal plane of said projection lens assembly, and means for directing a portion of air from said source toward said slide disposed in said receptacle to retain the slide against said projections and thereby in focus.

References Cited in the file of this patent

UNITED STATES PATENTS

| | | |
|---|---|---|
| 2,057,553 | Boecking | Oct. 13, 1936 |
| 2,235,876 | Gertz | Mar. 25, 1941 |
| 2,315,914 | Wengel | Apr. 6, 1943 |
| 2,443,171 | Tuttle | June 8, 1948 |
| 2,506,765 | Bach | May 9, 1950 |
| 2,691,320 | Borberg | Oct. 12, 1954 |